United States Patent
Ahn et al.

(10) Patent No.: US 8,681,175 B2
(45) Date of Patent: Mar. 25, 2014

(54) METHOD FOR DISPLAYING INFORMATION USING MAP IMAGE AND DISPLAY APPARATUS

(75) Inventors: Eun Seon Ahn, Pyeongtaek-si (KR); Jae Uk Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 180 days.

(21) Appl. No.: 12/785,815

(22) Filed: May 24, 2010

(65) Prior Publication Data

US 2011/0115805 A1 May 19, 2011

(30) Foreign Application Priority Data

Nov. 17, 2009 (KR) ........................ 10-2009-0110761

(51) Int. Cl.
| | |
|---|---|
| *G09G 5/00* | (2006.01) |
| *G06T 15/30* | (2011.01) |
| *G06T 11/40* | (2006.01) |
| *G06T 11/60* | (2006.01) |
| *G01C 21/36* | (2006.01) |

(52) U.S. Cl.
CPC ............... *G06T 15/30* (2013.01); *G06T 11/40* (2013.01); *G06T 11/60* (2013.01); *G01C 21/3679* (2013.01); *G01C 21/36* (2013.01); *G01C 21/3682* (2013.01)
USPC ........... 345/619; 701/426; 701/432; 701/438; 715/768

(58) Field of Classification Search
CPC ......... G06T 15/30; G06T 11/40; G06T 11/60; G01C 21/3679; G01C 21/36; G01C 21/3682

USPC ................. 701/200, 208, 220, 426, 432, 438; 715/764–768
See application file for complete search history.

(56) References Cited

U.S. PATENT DOCUMENTS

| | | | |
|---|---|---|---|
| 4,435,086 A | | 3/1984 | Kato |
| 5,802,492 A | * | 9/1998 | DeLorme et al. ........... 455/456.5 |
| 5,815,145 A | | 9/1998 | Matthews, III |
| 6,307,573 B1 | * | 10/2001 | Barros ........................... 715/764 |
| 6,359,636 B1 | | 3/2002 | Schindler et al. |
| 6,456,334 B1 | | 9/2002 | Duhault |

(Continued)

FOREIGN PATENT DOCUMENTS

| | | |
|---|---|---|
| JP | 2008-131181 | 6/2008 |
| JP | 2008-258894 | 10/2008 |

(Continued)

OTHER PUBLICATIONS

International Search Report dated Dec. 21, 2010. (PCT/KR2010/002835).

(Continued)

*Primary Examiner* — Jin-Cheng Wang
(74) *Attorney, Agent, or Firm* — KED & Associates LLP (57) ABSTRACT

A method for displaying time information and a display apparatus are provided. According to the method, a map image divided by a plurality of grids may be displayed and one of the grids on the displayed map image may be selected. Further, information about display target areas may be displayed when there are more than two display target areas in the selected grid and one of the information-displayed display target areas is selected. Furthermore, time information of the selected display target area may be displayed.

17 Claims, 9 Drawing Sheets

(56) References Cited

U.S. PATENT DOCUMENTS

| | | | |
|---|---|---|---|
| 6,481,011 B1 | 11/2002 | Lemmons | |
| 6,703,947 B1* | 3/2004 | Wallner | 341/50 |
| 7,751,971 B2* | 7/2010 | Chang et al. | 701/426 |
| 7,818,116 B1* | 10/2010 | Nesbitt | 701/412 |
| 7,894,984 B2* | 2/2011 | Rasmussen et al. | 701/452 |
| 2001/0029610 A1 | 10/2001 | Corvin et al. | |
| 2003/0182052 A1* | 9/2003 | DeLorme et al. | 701/201 |
| 2004/0119759 A1* | 6/2004 | Barros | 345/853 |
| 2004/0243307 A1* | 12/2004 | Geelen | 701/213 |
| 2004/0257340 A1* | 12/2004 | Jawerth | 345/157 |
| 2005/0251331 A1* | 11/2005 | Kreft | 701/207 |
| 2005/0278386 A1* | 12/2005 | Kelly et al. | 707/200 |
| 2006/0058952 A1* | 3/2006 | Cooper et al. | 701/208 |
| 2006/0058953 A1* | 3/2006 | Cooper et al. | 701/208 |
| 2006/0058961 A1* | 3/2006 | Chappell et al. | 701/220 |
| 2006/0080031 A1* | 4/2006 | Cooper et al. | 701/208 |
| 2006/0109145 A1* | 5/2006 | Chen | 340/995.24 |
| 2006/0174209 A1* | 8/2006 | Barros | 715/764 |
| 2006/0230356 A1 | 10/2006 | Sauve et al. | |
| 2006/0253907 A1* | 11/2006 | McConnell | 726/23 |
| 2007/0050143 A1* | 3/2007 | Jones | 702/5 |
| 2007/0186284 A1* | 8/2007 | McConnell | 726/25 |
| 2008/0016472 A1* | 1/2008 | Rohlf et al. | 715/848 |
| 2008/0040678 A1* | 2/2008 | Crump | 715/763 |
| 2008/0040684 A1* | 2/2008 | Crump | 715/808 |
| 2008/0074550 A1 | 3/2008 | Park | |
| 2008/0086456 A1 | 4/2008 | Rasanen et al. | |
| 2008/0104513 A1* | 5/2008 | Krogh | 715/711 |
| 2008/0152297 A1 | 6/2008 | Ubillos | |
| 2008/0172173 A1* | 7/2008 | Chang et al. | 701/207 |
| 2008/0222690 A1 | 9/2008 | Kim | |
| 2008/0295012 A1 | 11/2008 | Sloo et al. | |
| 2009/0015596 A1* | 1/2009 | Fuchs et al. | 345/619 |
| 2009/0046110 A1* | 2/2009 | Sadler et al. | 345/660 |
| 2009/0138826 A1* | 5/2009 | Barros | 715/841 |
| 2009/0158185 A1* | 6/2009 | Lacevic et al. | 715/768 |
| 2009/0234573 A1* | 9/2009 | Notarantonio | 701/201 |
| 2010/0017733 A1* | 1/2010 | Barros | 715/766 |
| 2010/0037167 A1 | 2/2010 | Son et al. | |
| 2010/0075643 A1* | 3/2010 | Cooper et al. | 455/414.1 |
| 2010/0095231 A1* | 4/2010 | Marlow | 715/764 |
| 2010/0115554 A1 | 5/2010 | Drouet et al. | |
| 2010/0162314 A1 | 6/2010 | Meare | |
| 2010/0162343 A1 | 6/2010 | Roberts et al. | |
| 2010/0201879 A1 | 8/2010 | VanDuyn et al. | |
| 2011/0007076 A1* | 1/2011 | Nielsen et al. | 345/441 |
| 2011/0043539 A1* | 2/2011 | Hiroki | 345/661 |
| 2011/0055024 A1* | 3/2011 | Shen | 705/14.72 |
| 2011/0282542 A9* | 11/2011 | Nielsen et al. | 701/33 |

FOREIGN PATENT DOCUMENTS

| | | |
|---|---|---|
| KR | 10-2006-0022448 | 3/2006 |
| KR | 10-2006-0066352 | 6/2006 |
| KR | 10-0687204 | 2/2007 |
| KR | 10-2008-0081182 | 9/2008 |
| KR | 10-2008-0109076 | 12/2008 |
| KR | 10-2009-0050577 | 5/2009 |
| KR | 10-2009-0096831 | 9/2009 |

OTHER PUBLICATIONS

International Search Report dated Dec. 21, 2010. (PCT/KR2010/002868).

International Search Report dated Dec. 24, 2010. (PCT/KR2010/002867).

U.S. Office Action issued in U.S. Appl. No. 12/785,838 dated Jun. 26, 2012.

U.S. Office Action issued in U.S. Appl. No. 12/785,881 dated May 9, 2012.

U.S. Office Action issued in U.S. Appl. No. 12/785,881 dated Dec. 5, 2012.

U.S. Office Action issued in U.S. Appl. No. 12/785,838 dated Dec. 27, 2012.

European Search Report dated Jul. 29, 2013.

* cited by examiner fig.2 fig.3

METHOD FOR DISPLAYING INFORMATION USING MAP IMAGE AND DISPLAY APPARATUS

The present application claims priority under 35 U.S.C. 119 and 35 U.S.C. 365 to Korean Patent Application No. 10-2009-0110761, filed in Korea on Nov. 17, 2009, which is hereby incorporated by reference in its entirety.

BACKGROUND

1. Field

A method for displaying information and a display apparatus are disclosed herein.

2. Background

Methods for displaying information and display apparatuses are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Hereinafter, a method for displaying time information and a display apparatus will be described in more detail according to embodiments, examples of which are illustrated in the accompanying drawings. Where possible, like reference numerals have been used to indicate like elements.

Figure 1:
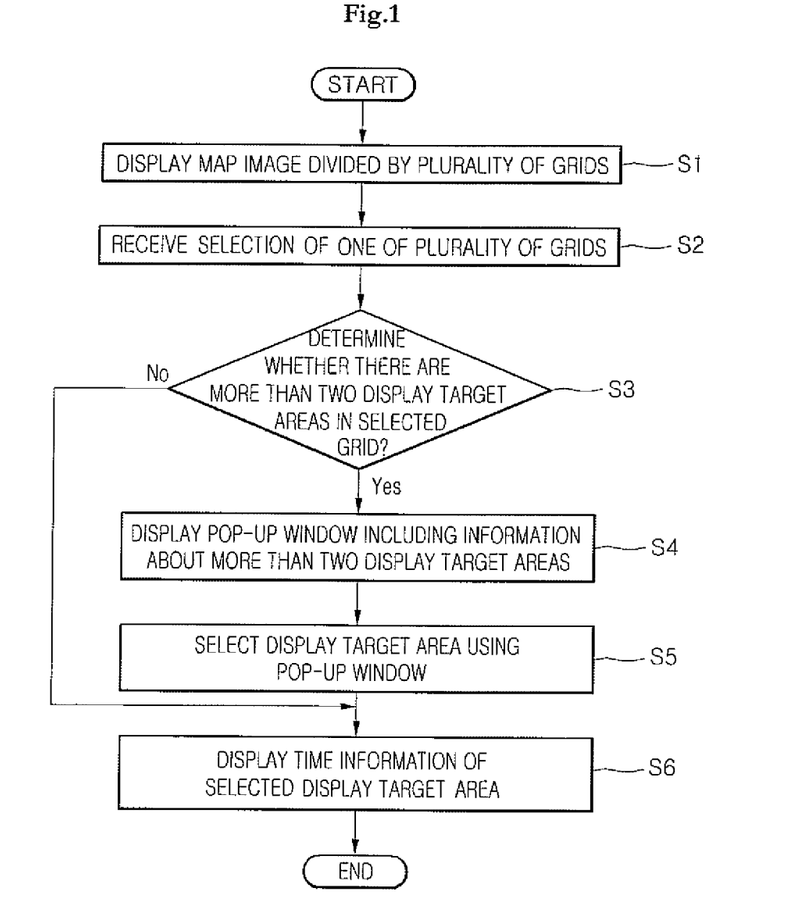
FIG. 1 is a flowchart of a method for displaying information according to an embodiment.

FIG. 1 is a flowchart of a method for displaying information according to an embodiment. The method for displaying information may be performed by a display apparatus capable of displaying an image in accordance with a signal input from outside of the display apparatus or stored thereon. However, the method for displaying information is not limited to being performed by a display apparatus having a main function for displaying an image. That is, the method may also be performed by, for example, mobile phones, smart phones, notebook computers, digital broadcasting terminals, Personal Digital assistants (PDAs), Portable Multimedia Players (PMPs), navigations, etc.

Referring to FIG. 1, the display apparatus according to this embodiment may display a map image divided by a plurality of grids, in step S1. For example, the map image may be an image including more than one display target area capable of being searched and displaying time information. For example, the map image may be a world atlas image. In addition, display target areas displayed in or on the map image may be cities of countries of the world, and may be preset or edited by a user, for example, adding or deleting cities.

For example, a user may add a specific city in order to display it on the map image, or may delete a specific city displayed on the map image. Information about the displayed map image and display target areas displayed in the map image may be stored in a storage device provided in a display apparatus, such as that shown in FIG. 4.

Figure 2:
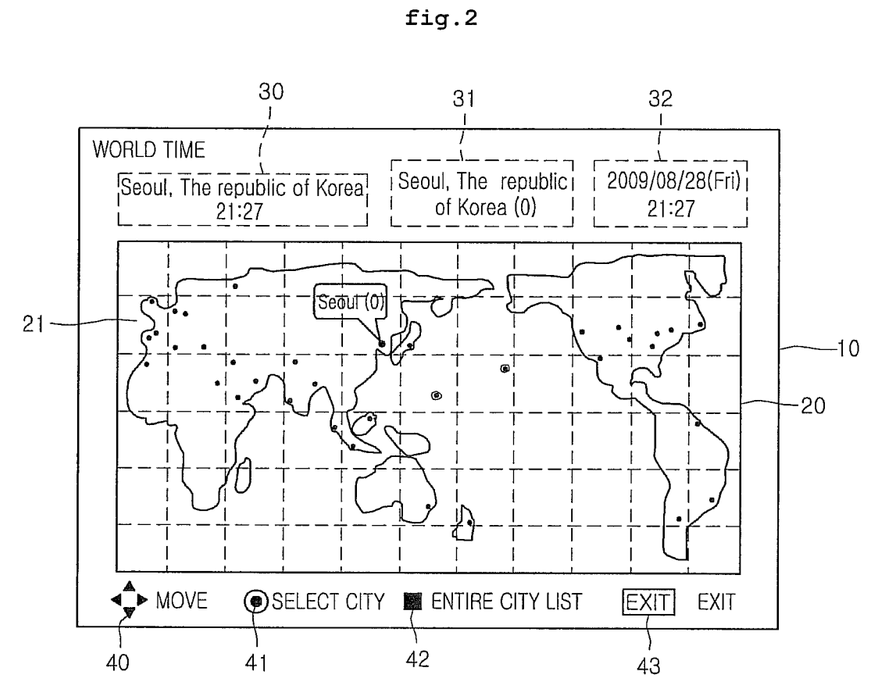
FIGS. 2 and 3 are views illustrating embodiments including a map image divided by a plurality of grids.

Referring to FIG. 2, a map image 20, which may display information about a plurality of display target areas, for example, cities, such as Seoul, Tokyo, New York, London, whose time information may be displayed, may be displayed on a screen 10 configured to be searched and display time information. Moreover, each geographical position of the plurality of display target areas may be displayed on the map image 20. For example, as shown in FIG. 2, a display target area may be indicated on the map image 20 with or by a point corresponding to the display target area.

According to one embodiment, the map image 20 may be divided into a plurality of grids 21, and thus, the plurality of display target areas may be searched by unit grid. A user may select one of display target areas displayed on the map image 20 using an input device, such as the user input device 100 of FIG. 5, in order to display time information of the selected display target area on the screen 10.

For example, a user input device configured to allow selection of the display target area may be a remote control device connected to a display device by wire or wireless communication methods, or may be a device that senses a movement of a body part, such as a finger of a user. In more detail, the remote control device may be an input device, such as a space remote or a mouse, that senses an operation of a user and transmits a signal corresponding thereto into a contents playing deice.

The display device according to one embodiment may include a touch panel that senses a position contacted by a specific object or a movement of the contacting object. Accordingly, a user may contact a screen using his finger or a specific object to select a specific display target area displayed on the map image 20.

However, it may be difficult to select a specific display target area displayed on the screen 10 as a point using a user input device, such as a space remote. Thus, according to one embodiment, a user may easily select a specific display target area whose time information the user would like to be displayed by searching display target areas 21 displayed on the map image 20 by a unit of a grid 21. Additionally, as shown in FIG. 2, the plurality of grids 21 may be displayed on the map image 20, and thus, may be recognized visually on the screen 10 by a user. Further, a reference area (for example, Seoul of the Republic of Korea) and a reference point of displayed time information may be displayed on the screen 10. That is, the reference area may be one of the display target areas displayed on the map image 20, and time information of a specific display target area may be displayed on the basis of or with respect to time information of the referenced area.

In more detail, time information of the display target area selected by a user may include time difference information based on a time of the reference area, for example, Seoul. Additionally, the reference area may be set to correspond to an area that the display apparatus presets or may be edited by user input.

Moreover, geographical information and a current time for the reference area may be displayed in the first area 30 of the screen 10. For example, information that the reference area is Seoul in the Republic of Korea and its current time is 9:27 p.m. may be displayed. In a second area 31 of the screen 10, geographical and time information, for example, a time difference with respect to the reference area, of an area selected by a user may be displayed in order to search time information. In a third area 32 of the screen 10, detailed information, for example, a date, a day of the week, and a current time, for the selected area may be displayed.

A menu for user input on the screen 10 may include a move key 40 that moves around the plurality of grids on the map image 20, a city select key 41 that selects a specific display target area, for example, a specific city, an entire city list key 42 that requests information including an entire city list whose time information may be displayed, and an exit key 43 that closes the current screen 10. As shown in FIG. 2, the move key 40 may include an up, down, left, and right key button or buttons. A user may use the up, down, left, and right key button or buttons to move around on the map image 20 by grid, and then, search and/or select an area for which a user wants to obtain time information. The above-mentioned user input keys 40, 41, 42, and 43 may be provided as part of a display apparatus or in a remote controlling device external to the display apparatus.

As illustrated in FIG. 2, a size of the plurality of grids 21 by which the map image 20 may be divided may be the same. Further, the size of the plurality of grids 21 may be adjustable; for example, the size of the plurality of grids 21 may be edited by user input.

That is, a user may search an area by moving around the map image 20 using a larger area unit after increasing the size of the grid 21. Additionally, a user may search an area by moving around the map image 20 using a smaller area unit after decreasing the size of the grid 21.

For example, when the size of the grid 21 is increased, an average number of display target areas included in one grid may be increased. When the size of the grid 21 is decreased, the average number of display target areas included in one grid may be decreased.

Additionally, a size of each of the plurality of grids by which the map image 20 is divided may vary. For example, the size of each of the plurality of grids 21 may be set differently according to distribution of the display target areas indicated on the map image 20.

Figure 3:
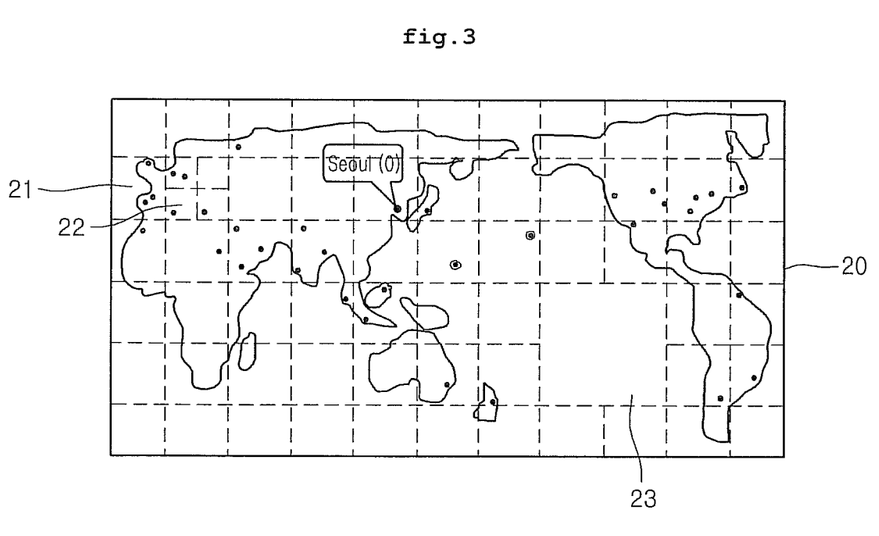

Referring to FIG. 3, the sizes of the grids 21, 22, and 23 displayed on the map image 20 may vary or be different. For example, as shown in FIG. 2, if the plurality of grids are set to have the same size, the number of display target areas included in each grid may differ greatly. As shown in FIG. 3, the size of the grid may be decreased in an area that includes a larger number of distributed display target areas, and the size of the grid may be increased in an area that includes a smaller number of distributed display target areas. That is, the size of the grid 22 placed around an area including a large number of distributed display target areas may be set smaller than the size of a typical grid 21. The size of the grid 23 placed around an area including a small number of distributed display target areas, for example, an area in which there are no display target area, may be set larger than the size of the typical grid 21. Accordingly, a user input for searching a display target area while moving around by the grid unit becomes more convenient.

Referring to FIG. 1, the display apparatus may receive selection of one of a plurality of grids on the map image 20, in step S2. For example, a user may utilize the up, down, left, and right key button or buttons provided in the display apparatus or a remote control device in order to perform a key input that allows the user to move around on the map image by grid. Accordingly, the user may select a display target area whose time information the user would like to be displayed, from the plurality of grids.

Next, the display apparatus may determine whether the selected grid contains more than two display target areas, in step S3. For example, one display target area, for example, a specific city whose time information may be displayed, or more than two display target areas may exist in the selected grid. Also, there may be no display target areas in the selected grid.

Based on the determination result in step S3, if there is only one display target area, for example, one city, in the selected grid, the display apparatus may display time information for the display target area, in step S6. The displayed time information may include a current time for the display target area and/or a time difference with respect to a reference area of the display target area, for example, a city. Further, it may include letters or images, which represent geographical information, a date, and a day of the week for the display target area.

As mentioned above, the display apparatus may display time information for the display target area in a predetermined area, for example, the second and third areas 31 and 32 of FIG. 2. In addition, if the selected grid includes more than two display target areas, for example, a plurality of cities, the display apparatus may display a pop-up window including information about the more than two display target areas in the grid, in step S4. For example, the displayed pop-up window may include geographical information for the more than two display target areas in the selected grid and may be displayed on the screen 10 in various forms. The pop-up window may be a new screen, which has a different configuration from the grid selection screen, as shown in FIG. 2.

In step S5, one of the more than two display target areas included in the selected grid may be selected through the pop-up window in the display apparatus. That is, a user may confirm information about display target areas included in the grid through the pop-up window. According to the confirmed information, one display target area, for example, a specific city, whose time information the user would like to be shown, may be selected. Next, the display apparatus may display time information of the display target area selected through the pop-up window, in step S6.

Figure 4:
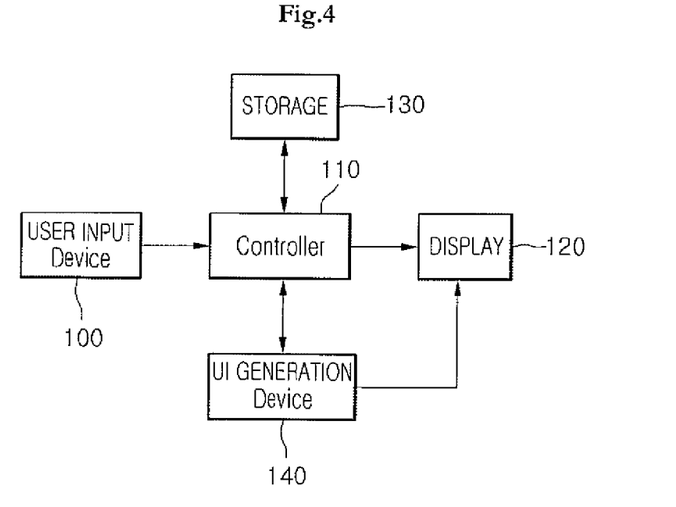
FIG. 4 is a block diagram of a display apparatus according to an embodiment.

FIG. 4 is a block diagram of a display apparatus according to an embodiment. The display apparatus may include a user input device 100, a controller 110, a display 120, a storage device 130, and a UI generation device 140.

Referring to FIG. 4, the display device 120 may receive an image signal and display an image corresponding to the image signal. According to one embodiment, the display 120, as mentioned with reference to FIGS. 1 to 3, may display a screen including a map image divided by a plurality of grids and a pop-up window.

Moreover, the display 120 may be provided in various forms, such as Plasma Display Panels (PDPs), Liquid Crystal Displays (LCDs), Organic Light Emitting Diodes (OLEDs), flexible displays, and 3D-displays. Additionally, the display 120 may be configured to include a touch screen, so as to be used as an input device in addition to an output device.

The controller 110 may control overall operation of the display 120, the storage device 130, and the UI generation device 140. The storage device 130 may store predetermined area names and standard time information corresponding to the predetermined area names. The area names may be names of important countries or cities around the world.

The standard time information may be Greenwich Mean Time (GMT). Currently, a world time has a time difference by a predetermined longitude interval, that is, one hour for each 15 degrees of longitude, based on a longitude passing through the Royal Observatory in Greenwich, London, the United Kingdom.

For example, the Republic of Korea uses GMT+9 as a standard time corresponding to 135 degrees east longitude. This means standard time in Korea is nine hours are faster than GMT. The storage device 130 may divide 24 hours into a predetermined number of standard times such as GMT+1, GMT+2, GMT+3, GMT+3:30, . . . GMT+21, and may also store place names related to countries or cities corresponding to a standard time in a lookup table form.

The above standard time may have one hour or thirty minutes difference. The storage device 130 may separately store the standard time. Further, the storage device 130 may be a related art flash memory built into a display apparatus.

The UI generation device 140 may generate a screen including a map image divided by a plurality of grids and a pop-up window, and then, may output the screen to the display 120, as described with reference to FIGS. 1 to 3, in response to a control signal of the controller 110. According to one embodiment, the controller 110 may read time information about a display target area selected by a user from the storage device 130, and may then calculate a current time of a city of the selected display target area through time information read from the storage device 130.

For example, the controller 110 may receive information about a current time of the reference area and standard time information about the selected display target area from the storage device 130, and may then calculate a current time of the selected display target area using the input information. Moreover, the controller 110 may receive the standard time, for example, current time information of Seoul, the Republic of Korea, from wire/wireless communicable external devices or servers in order to display more accurate time information.

The controller 110 may output the acquired time information to the UI generation device 140. Then, the UI generation device 140 may create a screen including time information related to an area that a user selects, based on the input time information, and output it to the display 120. Moreover, information about a plurality of grids, described with reference to FIGS. 1 to 3, may be stored in the storage device 130.

That is, identification information about each of the grids, for example, index information and information about a display target area in each of the grids, for example, geographical information about cities in a corresponding grid, may be stored in the storage device 130. Accordingly, the controller 110 may read information about a grid selected by a user from the storage device 130 and may obtain display target areas, for example, cities, in the selected grid through the information read from the storage device 130.

The controller 110 may output the obtained grid information to the UI generation device 140. The UI generation device 140 may form a pop-up window including information about each of the display target areas in the grid that a user selects based on the input information, and may then output it to the display 120. Further, the user input device 100 may include a plurality of buttons for a user's key input, such as up, down, left, and right key buttons for the grid unit movement.

Additionally, as shown in FIG. 4, the user input device 100 may be included in the display apparatus, or may be a separate device, for example, a remote control device, so as to transmit a remote control signal corresponding to a user input into a display apparatus.

Hereinafter, referring to FIGS. 5 to 13, a method for displaying information according to embodiments will be described in more detail.

Figure 5:
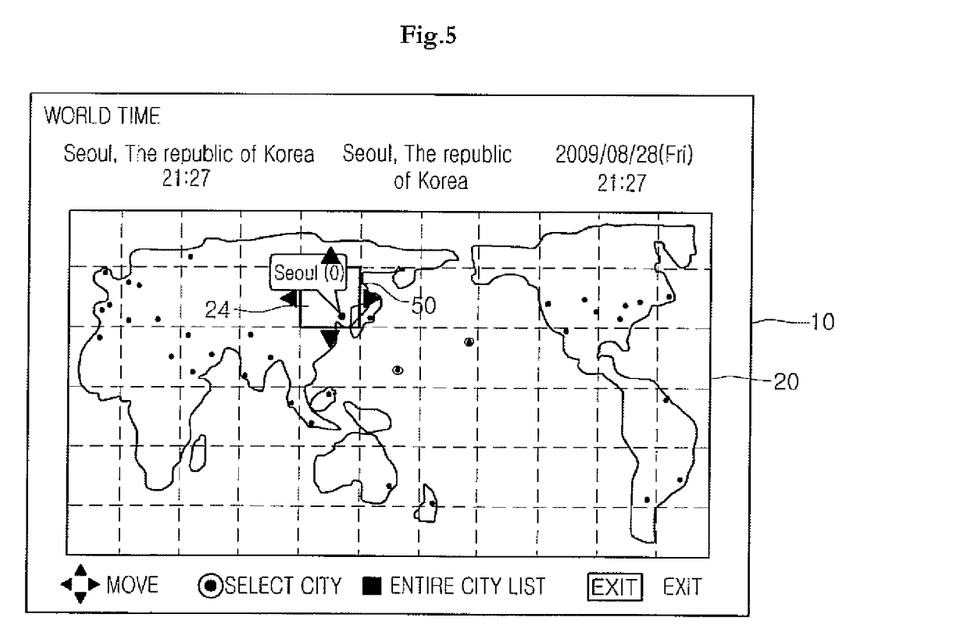
FIGS. 5 to 7 arc views illustrating a method for searching information according to an embodiment.
Figure 6:
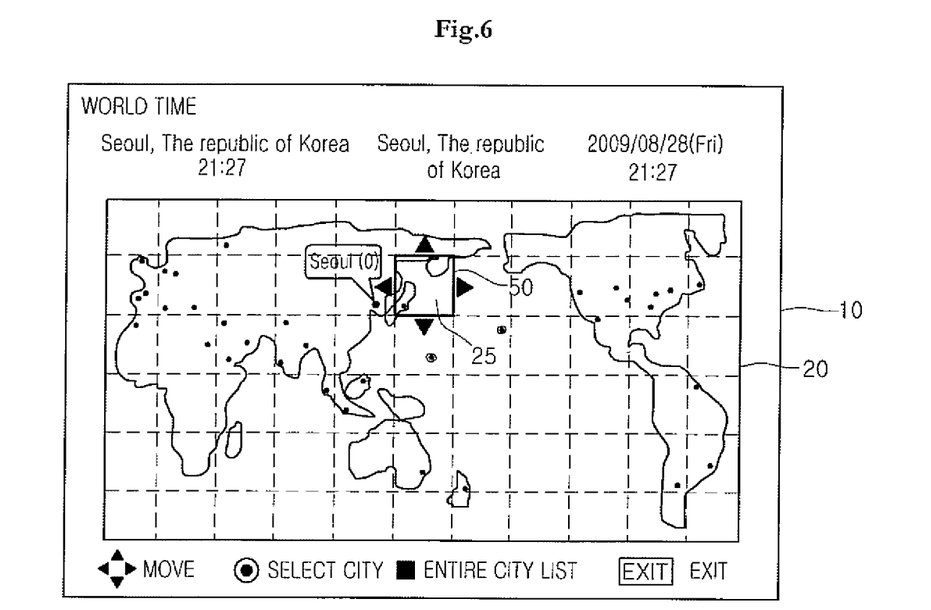
Figure 7:
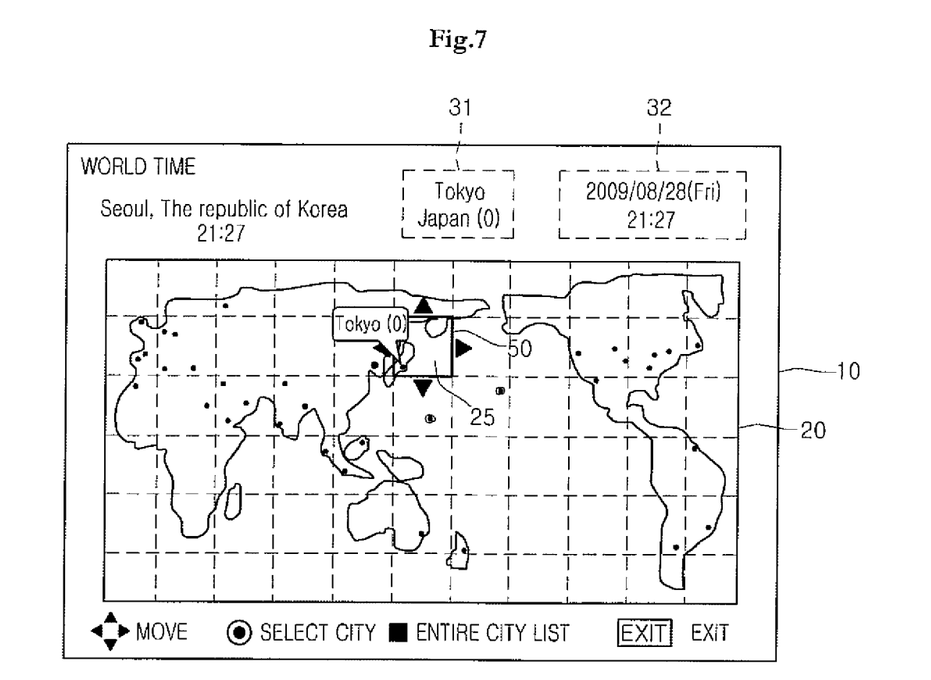

FIGS. 5 to 7 are views illustrating a method for searching information according to an embodiment. For convenience, description overlapping with the description of FIGS. 1 to 4 has been omitted. Referring to FIG. 5, a map image 20 divided by a plurality of grids may be displayed on a screen 10, and a reference area, for example, Seoul of the Republic of Korea, may be selected and displayed on the map image 20.

Additionally, a pointer 50 may be displayed on the map image 20 to allow selection of one of the plurality of grids, and may be moved by a grid unit in response to a user input. For example, a user may move the pointer 50 using up, down, left, and right key button or buttons built into the display apparatus or provided as part of an external remote control device. When the user presses the up, down, left, and right key button or buttons, the pointer 50 may move up, down, left, and right to be displayed in a position corresponding to a specific grid.

That is, in an initial screen for displaying time information, as shown in FIG. 5, the pointer 50 may be displayed to correspond to a grid 24 including a reference area, for example, Seoul. When a user presses a key button for the right direction, the pointer 50 may move from a current position grid to the right to correspond to a grid adjacent to the right of the current grid.

That is, when a user presses a key button for the right direction in the screen 10 of FIG. 5, the pointer 50 may move to a grid 25 adjacent at the right to a grid 24 including Seoul, as shown in FIG. 6. Referring to FIG. 7, Tokyo in Japan is included in the grid 25 at which the pointer 50 is positioned.

In such a state, if a user gives an input for selection of the grid 25, time information of a display target area, for example, Tokyo in Japan, in the grid 24 may be displayed on the screen 10. That is, according to one embodiment, when a user moves the pointer 50 to select a specific grid, if there is only one display target area in the selected grid, its time information may be displayed on the screen 10. As shown in FIG. 7, since there is only one display target area, for example, Tokyo, in the grid 25 selected by the user, time information of Tokyo may be immediately displayed in a specific region of the screen 10.

For example, geographical information about a currently selected city and time difference information with respect to a reference area may be displayed in the second area 31 of the screen 10. That is, the second area 31 may display a current date, a day of the week, and a time of the selected city.

By using information displayed in the second and third areas 31 and 32 of the screen 10, a user may recognize that a currently selected city is Tokyo in Japan, a time difference with respect to a reference area, for example, Seoul, is 0, and the time and date in Tokyo is currently 21:27 on Friday, 28 Aug. 2009. As shown in FIG. 7, information about a currently selected city, for example, the name of the city, may be additionally displayed on the map image 20.

According to another embodiment, if there is one display target area in the grid selected by a user, a pop-up window including time information and local information or weather information about the display target area may be displayed on the screen 10. For example, when described with reference to FIGS. 6 and 7, a pop-up window including time information about Tokyo and adjacent Osaka may be displayed on the screen 10.

Figure 8:
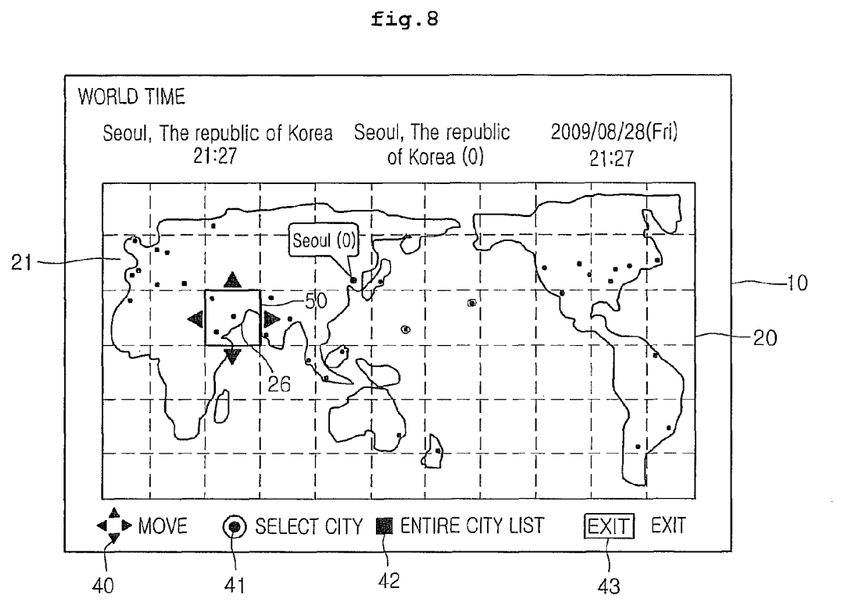
FIGS. 8 to 11 are views illustrating a method for searching information according to another embodiment.

FIGS. 8 to 11 are views illustrating a method for searching information according to another embodiment. The method according to this embodiment may display information when there are more than two display target areas in a selected grid. Referring to FIG. 8, a user may move a pointer 50 by a grid unit using an up, down, left, and right key button or buttons, and then select a grid 26 corresponding to an area where a city whose time information the user would like to be displayed is positioned. Moreover, there may be more than two display target areas, for example, a plurality of cities whose time information may be displayed, in the grid 26 selected by the user. In this case, a pop-up window having information about the plurality of cities in the grid 26 may be displayed on the screen.

Figure 9:
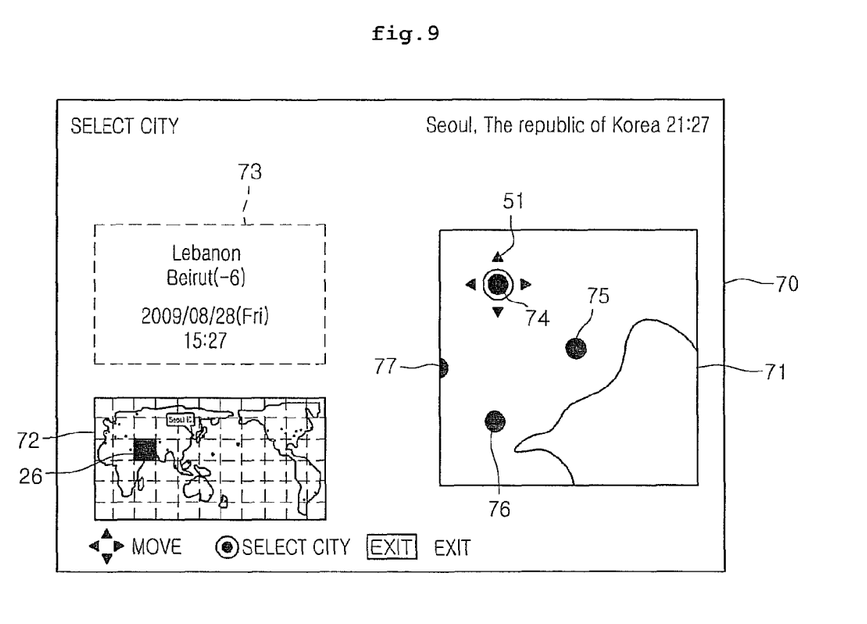

Referring to FIG. 9, there are, four cities in the grid 26 that the user selects, and accordingly, a pop-up window 70 having information about the four cities may be displayed on the screen. Additionally, the displayed pop-up window 70 may include a first area 71 that displays a map image corresponding to an area in the selected grid 26 and a second area 72, that displays a position of the selected grid 26 in the entire map image 20 shown in FIG. 8.

As shown in FIG. 9, the map image in the first area 71 of the pop-up window 70 may be an enlarged image with respect to an area corresponding to the selected grid 26, and the map image in the first area 72 of the pop-up window 70 may be a reduced image with respect to the entire map image 20. Additionally, the map image displayed in the first area 71 of the pop-up window 70 may include geographical information about display target areas, for example, the four cities, in the selected grid 26.

More specifically, points 74, 75, 76, and 77 corresponding to a position of each of four cities may be displayed on the map image in the first area 71 of the pop-up window 70. A pointer 51 may be displayed on the first area 71, which may be an enlarged map image, to allow selection of one of the plurality of cities, and may move around by city in the map image in response to user input.

For example, a user may move the pointer 51 by using the up, down, left, and right key button or buttons provided in a display apparatus or an external remote control device. When the user presses the up, down, left, and right key button or buttons, the pointer 51 may move in up, down, left, and right directions to be displayed on a point corresponding to a specific city. That is, using the up, down, left, and right key input, a user may move a pointer 51 to be positioned corresponding to one point 74 among a plurality of points 74, 75, 76, and 77 on the map image.

In this case, information about a city where the pointer 51 is positioned, for example, geographical information and time information of the corresponding city may be displayed in the third area 73 of the pop-up window 70. As shown in FIG. 9, the city where the pointer 51 is positioned may be Beirut in Lebanon. Accordingly, geographical information about Beirut in Lebanon, a time difference with respect to a reference area, for example, Seoul, a current date, a day of the week, and a time may be displayed in the third area 73 of the pop-up window 70.

Figure 10:
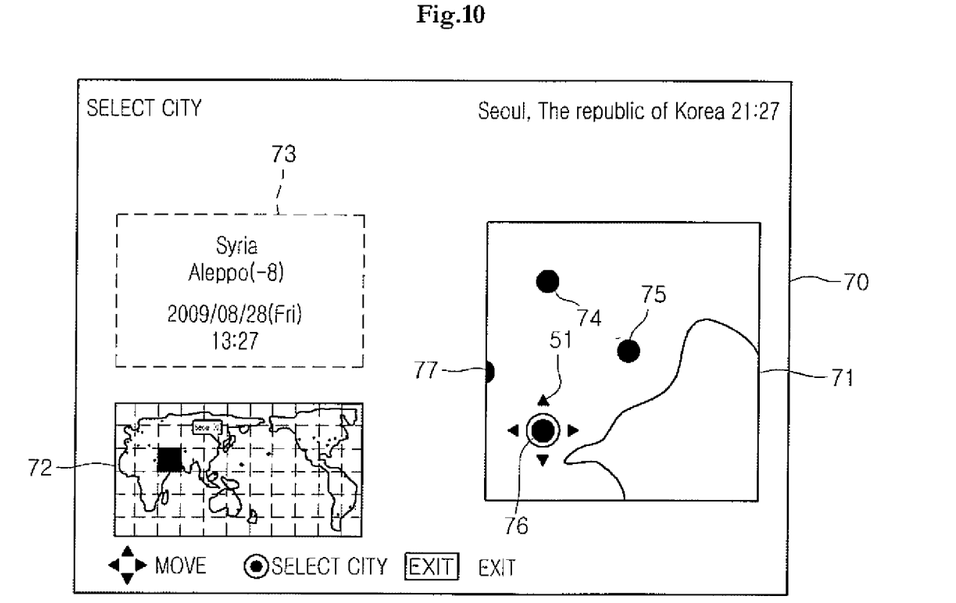

Additionally, the user may use the up, down, left, and right key button or buttons to move the pointer 51 to a position corresponding to the adjacent cities. For example, as shown in FIG. 9, when a user presses a key button for the down direction in the pop-up window 70, as shown in FIG. 10, the pointer 51 may move from the point 74 corresponding to Beirut to the point 76 located below the point 74.

Referring to FIG. 9, the city corresponding to the point 76 where the pointer 51 is positioned may be Aleppo in Syria. Accordingly, geographical information about Aleppo in Syria, a time difference with respect to a reference area, for example, Seoul, a current data, a day of the week, and a time may be displayed in the third area 73 of the pop-up window 70.

The user, as mentioned above, may move the pointer 51 on the map image within the pop-up window 70 to confirm information about each city included in the grid 26, and thus, may select a city whose time information the user would like to be displayed. For example, while the pointer 51 is positioned corresponding to a city whose time information the user would like to be displayed, the user may select a wanted city through a key input for city selection. Accordingly, time information for the selected city, for example, a current time of the city and a time difference with respect to a reference area, for example, Seoul, may be displayed on the screen 10.

Further, when the pointer 51 moves to a position external of the map image in the first area 71 by the key input of a user, a map image for another grid adjacent to the previously selected grid may be displayed in the first area 71 of the pop-up window 70. As shown in FIG. 10, a city 76 where the current pointer 51 is positioned among cities in the grid 26 that a user selects may be located at a lowest portion. Accordingly, when a user provides a key input for the down direction, there is no more area where the pointer 51 may move in the first area 71 of the map image. In this case, as shown in FIG. 11, an enlarged map image corresponding to the grid 27 positioned below the grid 26 that the user may select may be displayed in the first area 71 of the pop-up window 70.

Additionally, as the map image displayed in the first area 71 is changed, the position of the grid displayed in the second area 72 of the pop-up window 70 may also be changed. That is, as the map image displayed in the first area 71 is changed into the map image corresponding to the grid 27 adjacent to a bottom of the previous grid 26, a grid position on the map image of the second area 72 may be changed into the grid 27 adjacent to the bottom of the previous grid 26.

Figure 11:
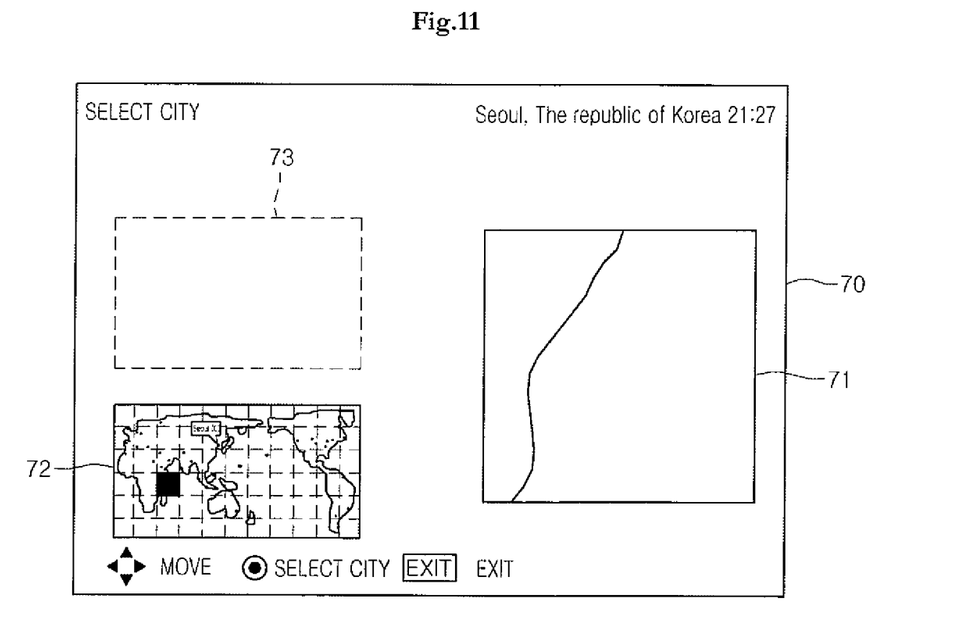

Additionally, referring to FIG. 11, there may be no city that may be displayed in the grid 27 of the pop-up window 70, and accordingly, cities of the map image displayed in the first area 71, more specifically, points corresponding to the cities may not be displayed. In this case, the pointer 51 is not displayed in the first area 71 of the pop-up window 70, and information for a specific city is not displayed in the third area 73. Therefore, a user may move the pointer 51 to another grid adjacent to the grid 27 using the up, down, left, and right key button or buttons, or close the pop-up window 70 using an exit button to return to the initial screen 10.

Figure 12:
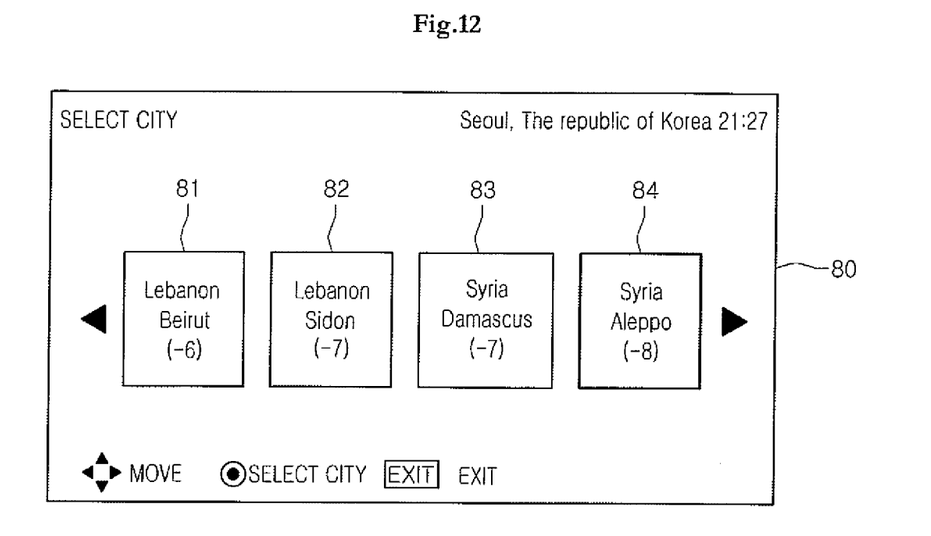
FIG. 12 is a view illustrating a method for searching information according to another embodiment.

FIG. 12 is a view illustrating a method for searching information according to another embodiment. Referring to FIG. 12, if there are display target areas, for example, cities whose time information may be displayed, in a grid selected by a user, a pop-up window 80 may be displayed in a screen 10 in order to align information related to the cities according to predetermined criteria.

The pop-up window 80 may include a plurality of blocks 81, 82, 83, and 84 having information about each of the cities included in the grid 26 that a user selects. For example, there may be Beirut and Sidon in Lebanon and Damascus and Aleppo in Syria, for example, a total of four cities, in the selected grid 26. The pop-up window 80 may arrange and display the cities based on a time difference with respect to a reference area.

The criteria for arranging information about the cities may be changed. For example, other arrangement criteria, such as alphabetical order, may be set by a user.

Moreover, if there are more than four cities in a grid selected by a user, the user may press the left and right key button or buttons to display information about cities that are not displayed in the pop-up window 80 among cities included in the selected grid.

The user may select a city whose time information the user would like to be displayed in displayable areas, for example, cities, of the pop-up window 80, by providing the left and right key input. For example, as shown in FIG. 12, a user may select an area 84 corresponding to Aleppo in Syria among four cities displayed in the pop-up window 80 by pressing a key button for the left and right directions. Accordingly, time information about Aleppo, for example, the selected city, such as a current time and a time difference with respect to a reference area, for example, Seoul may be displayed on the screen 10.

Figure 13:
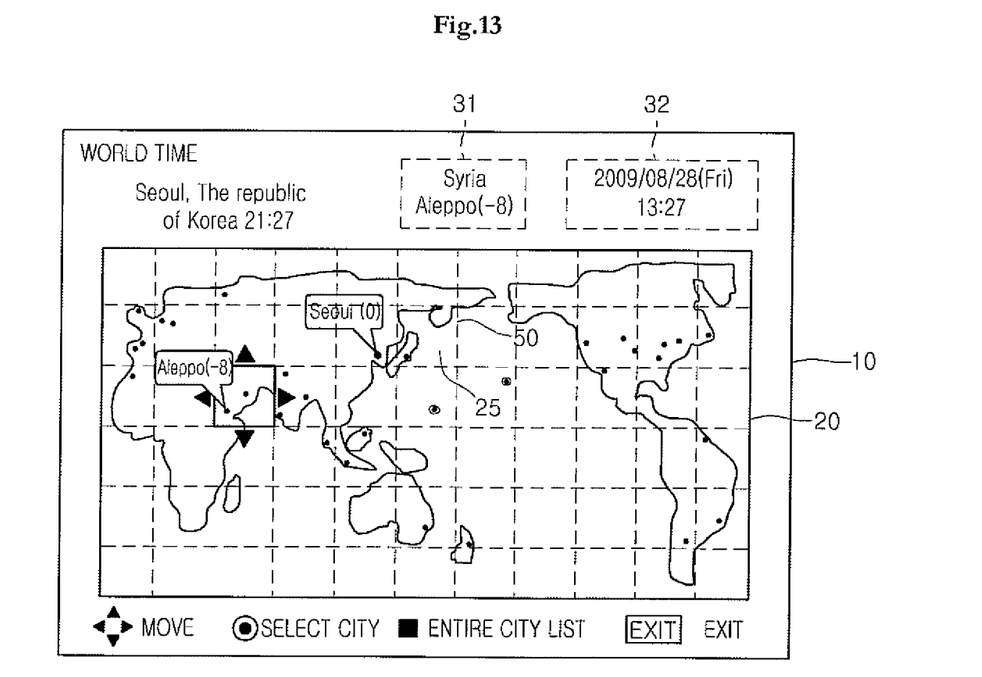
FIG. 13 is a view of a screen configuration for displaying information about an area selected by a user according to an embodiment.

FIG. 13 is a view of a screen configuration for displaying information about an area selected by a user according to an embodiment. FIG. 13 describes a method for displaying information of a city, which is selected using the method for searching information described with reference to FIGS. 8 to 12.

Referring to FIG. 13, a user may select Aleppo in Syria as a city whose time information the user would like to be displayed using the above method, and accordingly, time information about selected Aleppo may be displayed on the screen 10. That is, the position of Aleppo that a user selects and the pointer 51 may be displayed together on the map image 20 of the screen 10. Geographical information about Aleppo, a time difference with respect to the reference area, for example, Seoul, a current data, a day of the week, and a time may be displayed in the second and third areas 31 and 32 of the screen 10.

Figure 14:
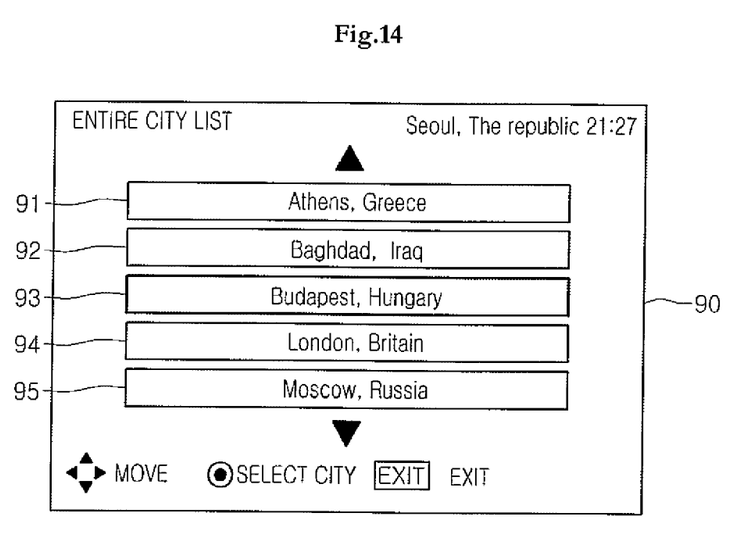
FIG. 14 is a view illustrating a method for searching information according to another embodiment.

FIG. 14 is a view illustrating a method for searching information according to another embodiment. Referring to FIG. 14, the pop-up window 90 including information about all display target areas, for example, an entire city list, whose time information may be displayed, may be displayed. That is, the pop-up window 90 may include a plurality of blocks 91, 92, 93, 94, and 95 to display information about each city of an entire city list.

For example, when a user selects an entire city list button 42 from the screen 10 shown in FIG. 12, the pop-up window 90, which may include information about each city arranged based on predetermined criteria, may be displayed on the screen 10. In a case in which it is difficult to locate an approximate position of a city whose time information the user would like to be confirmed, for example, the user is unclear as to which one of the divided grids on the map image 20 corresponds to the city, a user may request an entire city list as mentioned above.

In this case, as shown in FIG. 14, the pop-up window 90, where information about each city whose time information may be displayed, the cities being displayed in alphabetical order, may be displayed on the screen 10. A user may select one city whose time information the user would like to be displayed among the cities in the pop-up window 90, and accordingly, time information about the selected city may be displayed on the screen 10.

For example, a user may select the block 93 corresponding to Budapest in Hungary in the pop-up window 90 using an up and down key input. Accordingly, geographical information about Budapest and its time information, for example, a time difference with respect to Seoul, a current date, a day of the week, and a time, may be displayed on the screen 10, similar to that shown in FIG. 13.

Moreover, all information about each city may not be displayed in the pop-up window 90. In this case, a user may confirm a city, which is not displayed on the pop-up window 90, among the city list, and then may select the city through an up and down key input.

Additionally, a user may select a city whose time information the user would like to be displayed using an initial sound or alphabet through the pop-up window 90 described with reference to FIG. 14.

Figure 15:
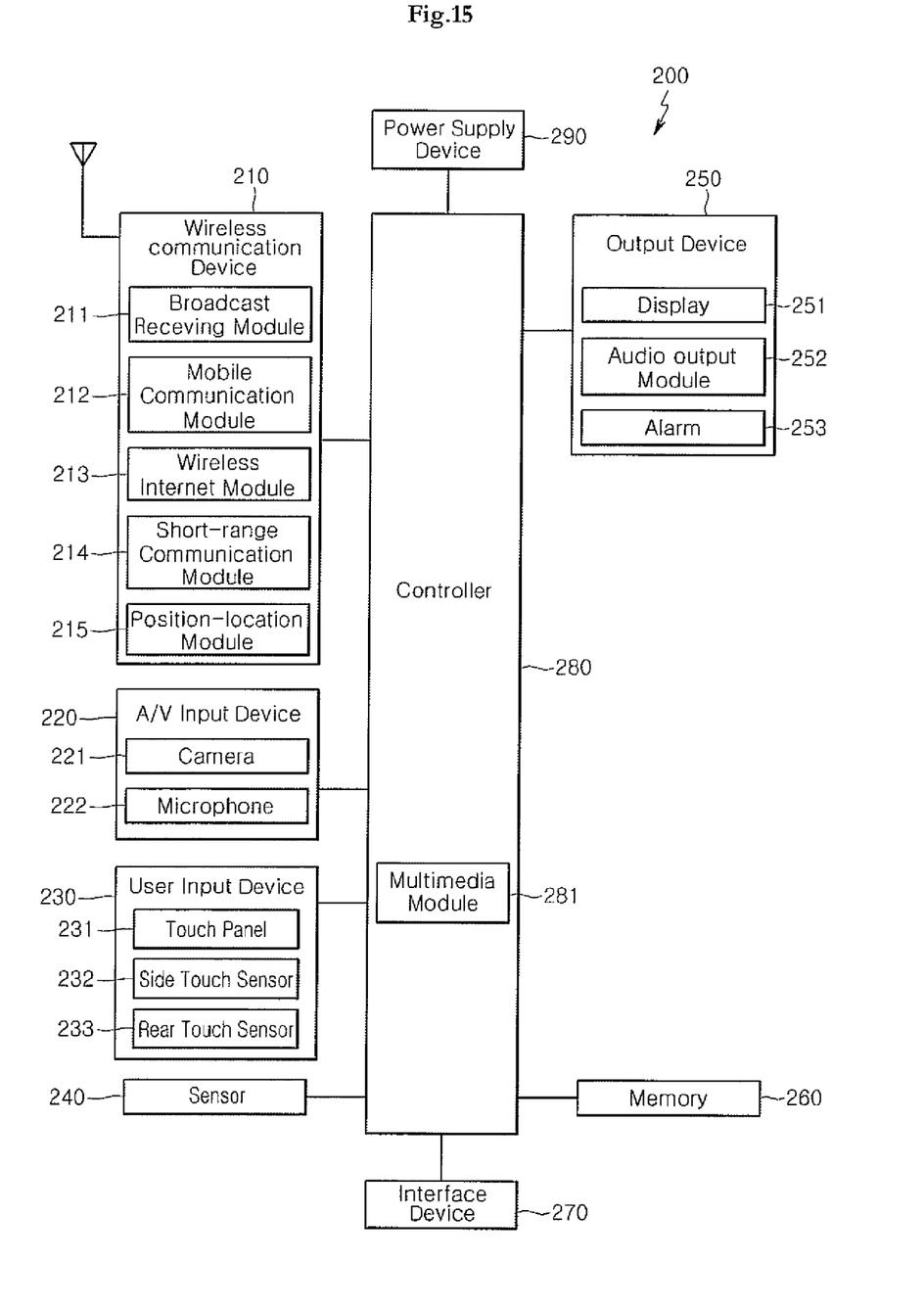
FIG. 15 is a block diagram of a terminal according to an embodiment.

FIG. 15 is a block diagram of a terminal according to an embodiment. The block diagram of FIG. 15 shows a configuration of a portable terminal as one example of a display apparatus to which the method for displaying time information according to embodiments may be applied.

Referring to FIG. 15, the portable terminal 200 may include a wireless communication device 210, an A/V input device 220, a user input device 230, a sensor 240, an output device 250, a memory 260, an interface device 270, a controller 280, and a power supply device 290. The wireless communication device 210 may include more than one component that allows wireless communication between the portable terminal 200 and a wireless communication system, or wireless communication between the portable terminal 200 and a network on which the portable terminal 200 is provided.

For example, the wireless communication device 210 may include a broadcasting receiver module 211, a mobile communication module 212, a wireless Internet module 213, a short-range communication module 214, and a position-location module 215. The broadcasting receiver module 211 may receive a broadcasting signal and/or broadcasting related information from an external broadcasting management server through a broadcasting channel. In addition, the broadcasting related information may be provided through a mobile communication network. In this case, it may be received by the mobile communication module 212. Moreover, a broadcasting signal and/or broadcasting related information received through the broadcasting receiver module 211 may be stored in the memory 260.

The mobile communication module 212 may receive and transmit a wireless signal from and into one of a station, an external terminal, and a server via a mobile communication network. The wireless Internet module 213 may be a module that connects with a wireless Internet connection, and may be internal or external.

The short-range communication module 214 may be a module for short-range communication. For example, Bluetooth, Radio Frequency Identification (RFID), Infrared Data Association ((IrDA), Ultra Wideband (UWB), or ZigBee may be used as short-range communication technologies.

Moreover, the position-location module 215 may be a module that confirms or obtains a position of a portable terminal. For example, the position-location module 215 may be a Global Positioning System (GPS) module.

In addition, the Audio/Video (A/V) input device 220 may receive input of an audio signal or a video signal and may include a camera 221 and a microphone 222. The camera 221 may process image frames, such as still images or moving images, obtained by an image sensor in, for example, a video conference mode or a picture mode. The processed image frame may be displayed in the display 251.

The image frames processed in the camera 221 may be stored in the memory 260 or transmitted externally through the wireless communication device 210. Two or more camera (s) 221 may be provided according to a terminal configuration.

The microphone 222 may receive an external sound signal in, for example, a calling mode, a recording mode, and a voice recognition mode, and may then process it as electrical sound data. Moreover, in the case of the calling mode, the processed sound data may be converted into a form that may be transmitted to a mobile communication station through the mobile communication module 212 and may then be output.

The user input device 230 may generate input data in order for a user to control an operation of the portable terminal 200. The user input device 230 may include, for example, a keypad dome switch, a touch pad (static pressure/static electricity), a jog wheel, or a jog switch.

The sensor 240 may generate a sensing signal to control an operation of the portable terminal 200 by sensing a current state of the portable terminal 200. The current state may include an open/close state of the portable terminal 200, a position of the portable terminal 200, a user contact occurrence, a direction of the portable terminal 200, and acceleration/deceleration of the portable terminal 200.

The interface device 270 may serve as an interface with all external devices connected to the portable terminal 200. For example, the interface device 270 may include a wire/wireless headset port, an external charging port, a wire/wireless data port, a memory card port, a port that connects a device with an identification module, an audio input/output (I/O) port, a video I/O port, and an earphone port.

The output device 250 may output, for example, an audio signal, a video signal, or an alarm signal, and may include, for example, the display 251, a sound output module 252, and an alarm 253. The display 251 may display information processed in the portable terminal 200. For example, when the portable terminal 200 is in a calling mode, the display 251 may display a User Interface (UI) or a Graphic User Interface (GUI) related to the calling mode.

The sound output module 252 may output audio data received from the wireless communication device 210 or stored in the memory 260 during, for example, a call signal reception, a calling mode, a recoding mode, a voice recognition mode, and a broadcasting receiving mode. The alarm 253 may output a signal for notifying a user of an event occurrence in the portable terminal 200.

The memory 260 may store a program that processes and controls the controller 280, and may also perform a function for temporary storage of input/output data, for example, a phonebook, a message, a still image, and a video.

The controller 280 may control overall operations of the portable terminal 200. For example, the controller 280 may control and process overall operations related to voice communication, data communication, and video conference call. Additionally, the controller 280 may include a multimedia module 281 for playing multimedia. The multimedia module 281 may be provided as part of the controller 280 or may be provided separately from the controller 280. The power supply device 290 may receive external power and internal power according to a control of the controller 280 to apply necessary power to various operations of each component.

According to one embodiment, the display 251 of the portable terminal 200 may display the screen 10 and the pop-up windows 70, 80, and 90, as described with reference to FIGS. 1 to 14. The memory 260 may store geographical information for each display target area and standard time information corresponding to each display target area.

The user input device 230, as described with reference to FIGS. 1 to 14, may provide a plurality of key buttons, for example, an up, down, left, and right key button or buttons for selecting a grid or a city, to perform a user input. Further, the controller 280 may create the screen 10 and pop-up windows 70, 80, and 90, and may then output them to the display 251 using information stored in the memory 260 and information input from the wireless communication device or the user input device 230. In addition, the wireless communication device 210 may receive time information or a reference area, for example, current time information of Seoul, about an area, for example, a specific city selected by a user, from an external server.

Examples of a computer readable recording medium include, for example, a read-only memory (ROM), a random-access memory (RAM), a CD-ROM, a magnetic tape, a floppy disk, an optical data storage device, and a carrier wave, such as data transmission through the Internet. The computer readable recording medium may also be distributed over network coupled computer systems, so that the computer readable code may be stored and executed in a distributed fashion. Also, functional programs, codes, and code segments for implementing embodiments may be easily construed by programmers skilled in the art.

According to one embodiment, an area that a user selects may be searched by a unit grid in a map that is divided by a plurality of grids, such that a user input to select a specific area whose time information the user would like to be displayed may be simplified.

Embodiments disclosed herein provide a method for efficiently searching and displaying time information of a specific area and a display apparatus.

According to one embodiment disclosed herein, a method for displaying time information is provided that may include displaying a map image divided by a plurality of grids; selecting one of the grids on the displayed map image; displaying information about more than two display target areas when there are the more than two display target areas in the selected grid; selecting one of the information-displayed display target areas; and displaying time information of the selected display target area.

According to another embodiment disclosed herein, a display apparatus that performs a method for displaying time information is provided.

According to yet another embodiment disclosed herein, a computer readable recording medium that stores a program, the program being used for executing a method for displaying time information is provided.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for displaying information on a display apparatus including a display, a user input device, and a controller, the method comprising:

displaying, on the display, a map image divided by a plurality of grids based on a distributed area;
receiving, by the user input device, a first input selecting one of the plurality of grids;
displaying, on the display, information about display target areas in a pop-up window when there are more than two display target areas in the selected one of the plurality of grids in response to the first input, wherein the pop-up window comprises a first area that displays an enlarged image with respect to an area corresponding to the selected grid;
receiving, by the user input device, a second input selecting one of the display target areas;
and displaying, on the display, detailed information about the selected one of the display target area in response to the second input.

2. The method according to claim 1, wherein the information includes at least one of time information or date information about the display target areas.

3. The method according to claim 1, further comprising displaying a pointer on the map image, the pointer being movable by unit grid according to an up, down, left, and right key input of a user.

4. The method according to claim 1, further comprising displaying a pointer in the first area, wherein the pointer is movable according to an up, down, left, and right key input from the user input device.

5. The method according to claim 4, further comprising when the pointer is moved outside of the first area, displaying in the first area another map image corresponding to another grid adjacent to the selected one of the plurality of grids.

6. The method according to claim 1, wherein the pop-up window displays at least one of geographical information, a current time, or a time difference with respect to a reference area of the selected display target area.

7. The method according to claim 1, wherein the pop-up window comprises a second area that displays a position of the selected one of the plurality of grids.

8. The method according to claim 7, wherein the position of the selected one of the plurality of grids displayed in the second area is changed according to a change of the map information displayed in the first area.

9. The method according to claim 1, wherein the pop-up window arranges the more than two display target areas in the selected one of the plurality of grids according to predetermined criteria and displays arranged information about the more than two display target areas.

10. The method according to claim 9, wherein the display target areas are arranged based on a time difference with respect to a reference area.

11. The method according to claim 1, further comprising:
receiving a request from a user, through the user input device, for information about all available display target areas;
arranging, by the controller, information about each of the display target areas according to predetermined criteria in response to the received request; and
selecting, by the user input device, an area whose time information is to be displayed using the displayed information.

12. The method according to claim 1, wherein the information comprises at least one of a current time of the selected area or a time difference with respect to a reference area.

13. A display apparatus including a display, a user input device, and a controller that performs the method for displaying information of claim 1.

14. A non-transitory computer readable recording medium storing a program, the program being used for executing the method of claim 1.

15. The method according to claim 1, wherein the plurality of grids are the same size.

16. The method according to claim 1, wherein sizes of the plurality of grids are different.

17. The method according to claim 1, wherein a size of each of the plurality of grids is different according to a distribution of display target areas.

* * * * *